N. S. MONROE.

ROAD LEVELING DEVICE.

APPLICATION FILED DEC. 23, 1913.

Reissued Mar. 31, 1914.

13,708

5 SHEETS—SHEET 1.

Witnesses:
G. T. L. Wright
H. Hough

Inventor
Nathaniel S. Monroe

By
Wm. Bagger
Attorney

N. S. MONROE.

ROAD LEVELING DEVICE.

APPLICATION FILED DEC. 23, 1913.

Reissued Mar. 31, 1914.

13,708.

5 SHEETS—SHEET 2.

Witnesses

G. T. L. Wright

H. Hough

Inventor

Nathaniel S. Monroe

By

Wm. Bagg

Attorney

N. S. MONROE.

ROAD LEVELING DEVICE.

APPLICATION FILED DEC. 23, 1913.

Reissued Mar. 31, 1914.

13,708.

5 SHEETS—SHEET 3.

Witnesses
J. T. Wright
H. Hough

Inventor
Nathaniel S. Monroe

By

Attorney

N. S. MONROE.
ROAD LEVELING DEVICE.
APPLICATION FILED DEC. 23, 1913.
Reissued Mar. 31, 1914.
13,708.
5 SHEETS—SHEET 4.
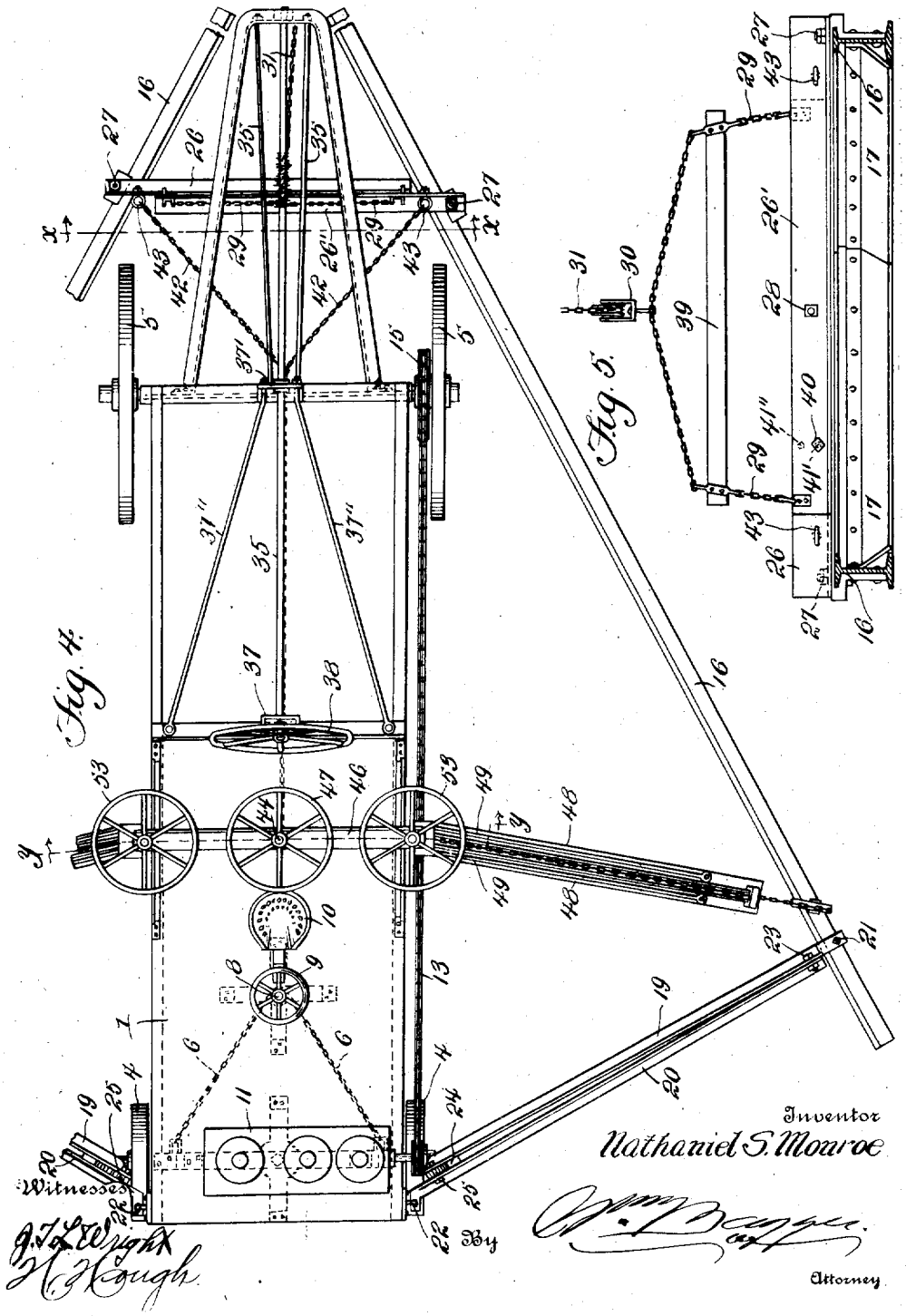

N. S. MONROE.
ROAD LEVELING DEVICE.
APPLICATION FILED DEC. 23, 1913.
Reissued Mar. 31, 1914.
13,708.
5 SHEETS—SHEET 5.
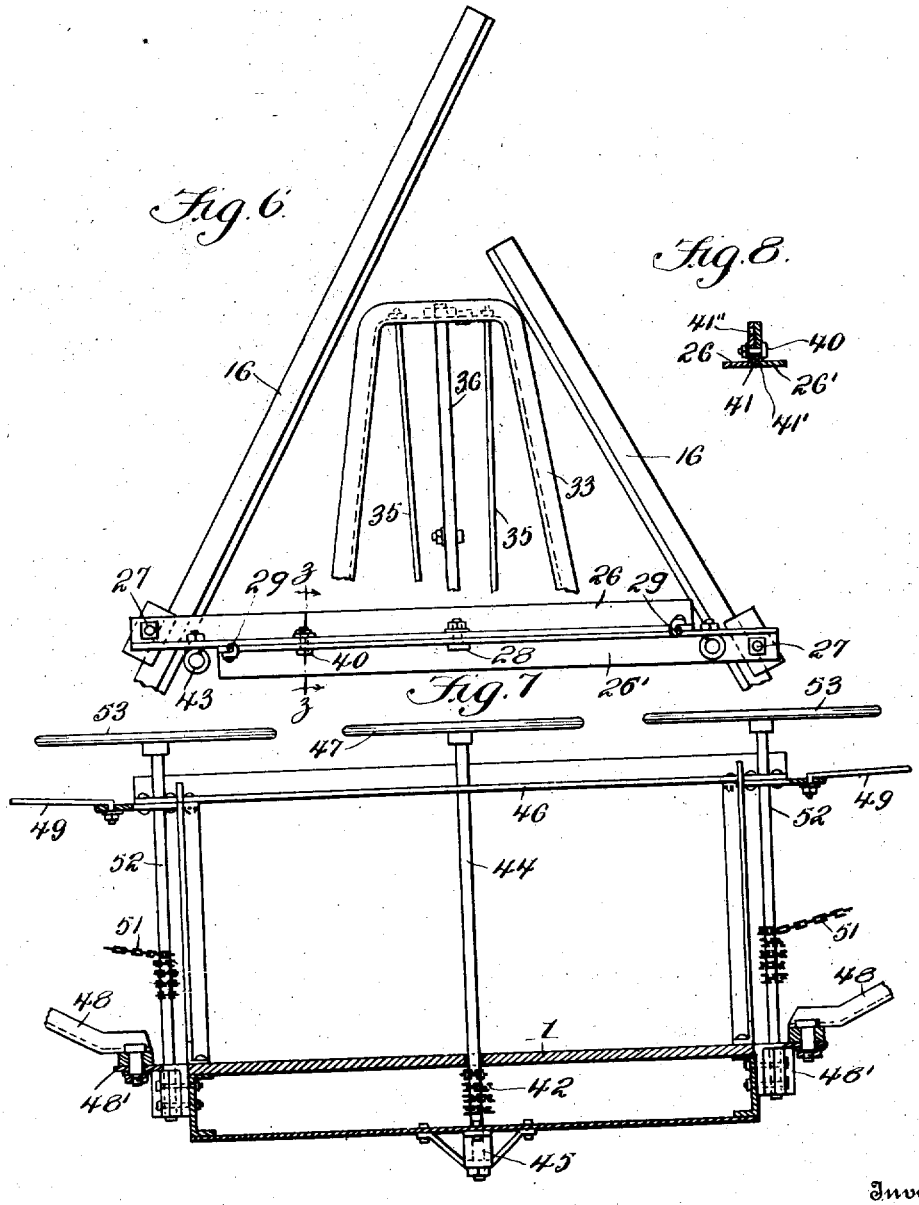
Inventor
Nathaniel S. Monroe
Witnesses
J. T. L. Wright
H. Hough
By Wm. Bagge
Attorney

UNITED STATES PATENT OFFICE.

NATHANIEL S. MONROE, OF ARTHUR, ILLINOIS.

ROAD-LEVELING DEVICE.

13,708. Specification of Reissued Letters Patent. Reissued Mar. 31, 1914.

Original No. 1,015,820, dated January 30, 1912, Serial No. 616,715. Application for reissue filed December 23, 1913. Serial No. 808,509.

*To all whom it may concern:*

Be it known that I, NATHANIEL S. MONROE, a citizen of the United States, residing at Arthur, in the county of Douglas and State of Illinois, have invented certain new and useful Improvements in Road-Leveling Devices, of which the following is a specification.

My invention relates to road leveling devices and has for its object the provision of a device of this character which will be of improved construction and efficient in operation.

Other objects will appear hereinafter.

With these objects in view, my invention consists in the combination and arrangement of parts hereinafter described and claimed.

My invention will be more readily understood by reference to the accompanying drawings forming part of this specification and in which—

Figure 1:
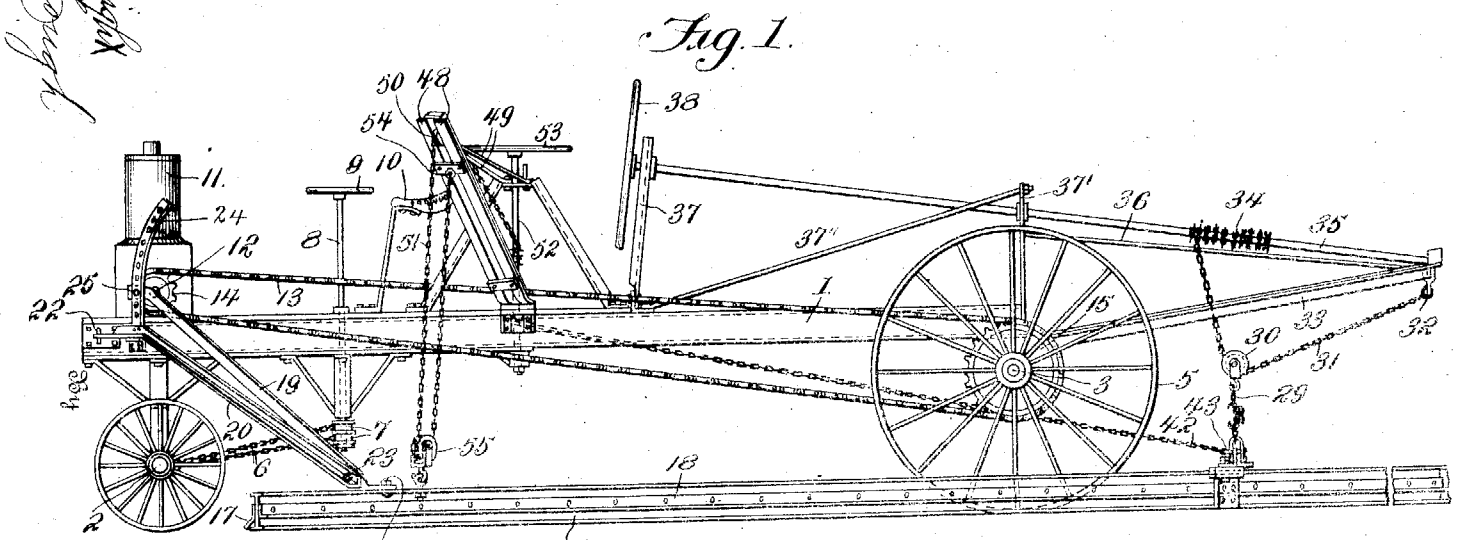
Figure 2:
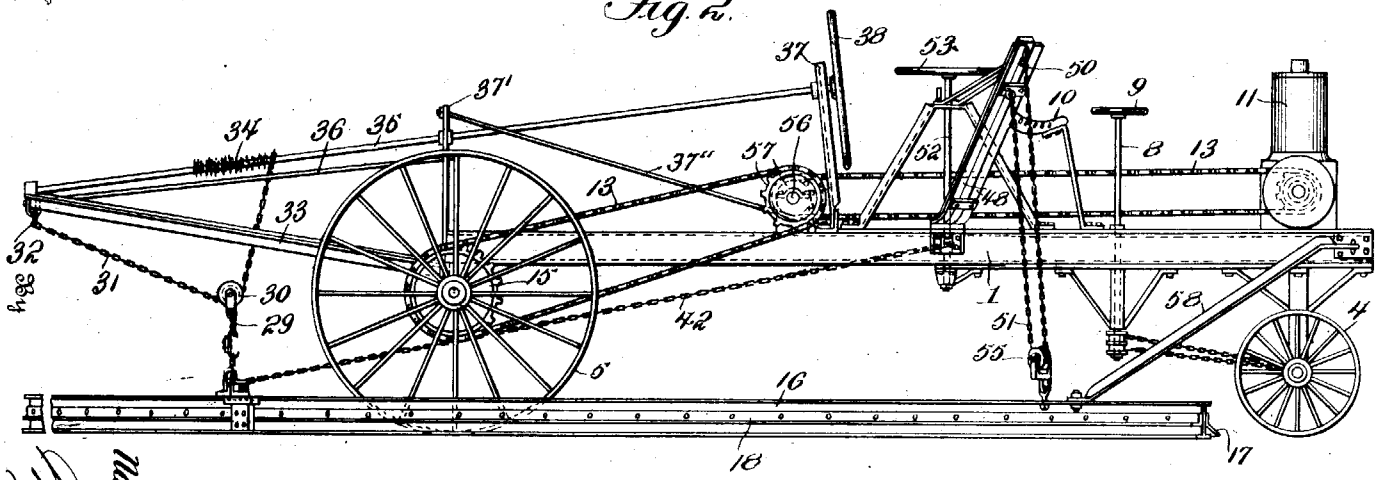
Figure 3:
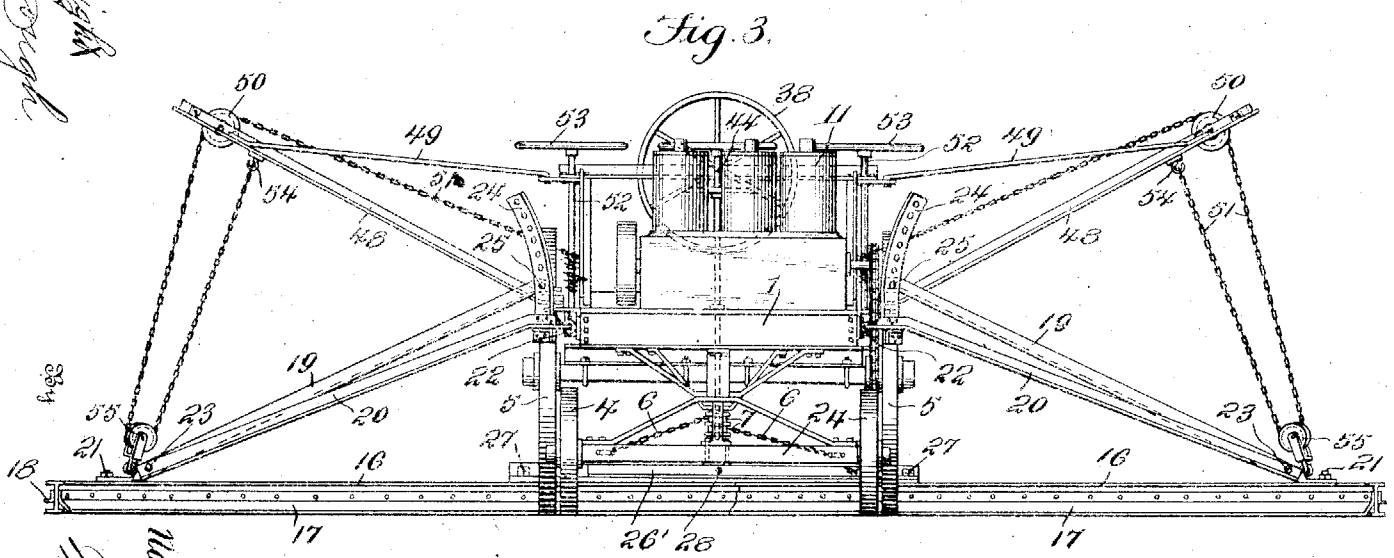

Figure 1 is a side elevation of a road leveling device embodying my invention, Fig. 2 is a similar view of a slightly modified form of the machine, Fig. 3 is a front elevation of the form shown in Fig. 1, Fig. 4 is a top plan view thereof, one side being broken away, Fig. 5 is an enlarged detail section taken on substantially line $x$—$x$ of Fig. 4, Fig. 6 is a fragmentary top view of the rearward end of the machine, Fig. 7 is an enlarged transverse section taken on substantially line $y$—$y$ of Fig. 4 and Fig. 8 is a detail section taken on line $z$—$z$ of Fig. 6.

The preferred form of my construction as illustrated in the drawings, comprises a body or platform 1 the respective ends of which are mounted upon the front and rear axles 2 and 3, said axles being supported in wheels 4 and 5 respectively. The front axle 2 is mounted for horizontal oscillation for steering, operation of said axle in order to effect steering, being effected through the medium of chains 6, which are connected with winding drums 7 fixed to the lower end of the rotatably mounted steering bar 8. The upper end of the bar 8 is provided with the hand wheel 9 which may be engaged to effect rotation of said bar from a position in the driver's seat 10 which is arranged as shown in close proximity thereto.

Mounted upon the platform 1 at the forward end thereof is a motor 11 which may be of any approved design or type, the power shaft 12 of said motor being operatively connected with the rear or driving axle 3 by a sprocket chain 13, said chain traveling over sprocket wheels 14 and 15 carried respectively by said power shaft and axle.

Arranged at the opposite sides of the body 1 are elongated scraper bars each of which comprises the I-beam 16 to the inner side of which is secured the scraping plate 17 and to the outer side thereof the reinforcing angle-iron 18. The forward divergently disposed ends of said scraper bars are pivotally connected with the forward end of the body 1 through the medium of connecting devices each of which comprises a pair of links 19 and 20. The outer extremity of each link 19 is pivoted at 21 with the forward end of the adjacent scraper bar so as to permit of relative swinging of said scraper bars in a horizontal direction. This being so, angular adjustment of the scraper bars relative to the surface acted upon may evidently be permitted by rocking the inner ends of the links 19 vertically. The inner extremity of the link 20 is pivotally connected at 22 with the body 1, the outer extremity of said link being pivotally connected at 23 with the corresponding link 19 adjacent the outer extremity thereof. Carried by each of the links 20 adjacent the inner extremity thereof is an upwardly extending curved bar 24, the corresponding pivotal point 23 being the center of curvature of said member. Said members 24 serve to support the inner extremities of the links 19, connection between said links and said supporting members being effected by the pins or bolts 25. The members 24 are each provided with a plurality of spaced perforations for engagement by the pin 25 coöperating therewith, such construction evidently affording means for securing the inner extremities of the links 19 in various angular positions and hence the scraper bars 16 in various angular positions relative to the surface acted upon as above mentioned. With this provision then in order to effect such adjustment of the scraper bars, it is only required to remove the pins 25 and to adjust the links 19 to properly position said scraper bars whereupon said pins may again be inserted to lock said links and hence said bars in their position of adjustment.

The rearward ends of the scraper bars are connected by a sectional connecting member which comprises the sections 26 and 26′. The outer extremities of the sections 26 and 26′ are pivotally connected as at 27 with the scraper bars in the same manner as links 19, above described, the overlapping inner end portions of said sections being pivotally connected medially by the pivot pin or bolt 28 so as to permit of vertical oscillation of said sections. The inner extremities of said sections 26 and 26′ are connected with chains 29, as shown in Fig. 5, said chains 29 being connected at their upper extremities with a pulley 30 suspended in the bight of the chain 31; the rearward extremity of said chain 31 being fixed as at 32 with the rearward extremity of an extension 33 of the body 1, the opposite extremity 34 of said chain 31 being wrapped around a drum shaft 35.

36 indicates brace rods for the extension 33. The shaft 35 is rotatably mounted in bearings 37 and 37′, the forward end of said shaft being provided with a hand-wheel 38 which may be operated from a position upon the body 1.

37″ indicates brace rods for the bearing 37′. The arrangement is such, as will be observed, that by rotating the shaft 35 to effect the winding or unwinding of the chain 31, the pulley 30 may be vertically adjusted and hence the rearward extremities of the scraper bars which are connected therewith. Extending between the lower ends of the chains 29 is a bar 39 to the respective extremities of which said chains are secured intermediate their extremities as shown in Fig. 5. As will be observed, the lower ends of the chains 29 depend divergently from said bar 39. This being so, upon upward movement of the pulley 30 as in the manner just described, said chains 29, in being correspondingly moved upwardly, will tend to assume a vertical position with the result that the inner ends of the connecting sections 26 and 26′ will be rocked upwardly and hence the scraper bars angularly rocked relative to the surface of the ground. This being so, upon upward drawing upon the chains 29, with the inner ends of the connecting sections 26 and 26′ free, angular adjustment of the scraper bars in the manner permitted by the links 19 will be effected. In view of the fact that the scraper bars, in order to be effective, are usually of great length and of heavy weight, it will be seen that the provision of the means just described for tilting them to various inclined positions will be peculiarly desirable and efficient, owing to the fact that considerable power and leverage will be exerted thereby. The bars or links 19 in connection with the curved members 24 having spaced perforations may be utilized for locking the scraper bars at the front securely at various inclinations. It will, furthermore, be seen that the construction just described provides a suspending means for the rear ends of the scraper bars which, in conjunction with the front suspending means, will be capable of supporting the scraper bars entirely clear of the ground, enabling them to swing freely to various positions, and to be lowered to the ground in various adjusted positions, thereby avoiding the resistance of frictional contact between the parts and accordingly facilitating the adjusting operation, while permitting the bars to be swung without the exercise of great power. The flexible hoisting and suspending devices, in addition to permitting the bars to be elevated for free swinging and tilting motions, also adapt the bars when lowered, and after being spread widely apart, to gravitate back to normal position and to remain in contact with the ground by reason of their weight as the machine travels ahead, so that the divergent ends of the bars may be automatically adjusted to decrease their spread. The bar 39 however, as will be observed, serves to limit such adjustment of the scraper bars through the medium of the chains 29, since upon the latter assuming a vertical position, angular adjustment of the scraper bars by said chains will cease. If desired the sections 26 and 26′ may be rigidly connected, so as to form a rigid connecting member, by the pin or bolt 40 which is adapted to engage registering perforations 41 and 41′ provided in the sections 26 and 26′ respectively as clearly shown in Figs. 5, 6 and 8. Also, said sections may be locked in angularly disposed positions through the medium of said pin by reason of the provision of a second perforation 41″ in the section 26, said perforation 41″ being brought into registration with the perforation 41′ of the section 26′ when said sections 26 and 26′ are rocked to their angular positions by the chains 29.

Arranged at the rearward end of the body 1 medially thereunder, is a chain 42, the rearward bifurcated end thereof being connected with the connecting member formed by the sections 26 and 26′ through the medium of eyes 43 provided at the respective ends of said member. The forward extremity of the chain 42 is secured to a vertically extending shaft 44 which is mounted centrally in the body 1, the lower extremity of said shaft being mounted in a bearing 45 and the upper end thereof in a transversely extending bearing member 46. Provided at the upper extremity of the shaft 44 is a hand-wheel 47 through the medium of which said shaft may be readily rotated by the hand. With this provision, it will be observed that the rearward ends of the scraper bars may be forwardly adjusted, that is drawn forwardly by proper rotation of the shaft 44. Such movement of said bars evidently effects increased divergence of the forward extremities thereof, thus adapting the device for employment upon roads of various widths. With this construction then, in order to adjust the width of the path of the machine, that is the width of the strip acted upon when the machine is in operation, the hand-wheel 44 needs only to be properly rotated, such rotation of said wheel being evidently effected from a position upon the body 1.

Provided at opposite sides of the body 1 substantially midway the extremities thereof, are outwardly projecting cranes each comprising a pair of parallelly extending bars 48, the inner ends of which are swingingly secured to the bearing members 48′ provided at the sides of the body 1; brace rods 49 being arranged for coöperation with the members 48. Mounted in the outer extremities of said cranes between the arms 48 are sheaves 50 over which travel chains 51. Corresponding ends of the chains 51 are secured to shafts 52 which are mounted at the opposite sides of the body 1, the respective ends of said shafts being mounted in bearings provided in members 48′ and 43 as clearly illustrated in Fig. 7. Provided at the upper extremities of the shafts 52 are hand-wheels 53 whereby said shafts 52 may be readily rotated to effect the winding of the chains 51 thereon or unwinding of said chains therefrom. The opposite extremities of the chains 51 are fastened at 54 to the corresponding cranes adjacent to the outer extremities of the latter. Carried in the bight of each of the chains 51 is a pulley 55 which is connected with the forward extremity of the adjacent scraper bar. With this arrangement it will be seen that vertical adjustment of said ends of said scraper bars may be readily effected by operation of the shafts 52 to effect the winding of the chains 51 thereon, since by this operation said chains will be shortened and hence the pulleys 55 elevated carrying the forward ends of the scraper bars therewith.

With a road leveling device then of the construction as set forth, a construction is provided wherein the scraper bars may be adjusted to any angular position relative to the surface acted upon in order to regulate the cut thereof. Provision is also made for effecting the operative width of the device and for elevating the scraper bars to inoperative position if desired, all adjustments being adapted to be effected from a position upon the body of the device. The rearward ends of the scraper bars, as clearly shown in Fig. 6, terminate in spaced relation in order to permit of the passage of lumps of earth or other solid matter which may be entrapped between the scraper bars, said ends, however, terminating in such a manner that the path of one will overlap that of the other so that the entire surface of the road will be acted upon.

In Fig. 2 wherein is illustrated the modified form of the device, a counter-shaft 56 and counter-sprockets 57 are interposed in the chain 13, such construction being found of high efficiency. Also in this form the means for adjusting the angular dispositions of the scraper bars relative to the surface of the road acted upon, namely the links 19 and 20 and the parts coöperating therewith, are dispensed with, a single link 58 being employed in their stead. With the exceptions noted, the construction shown in Fig. 2 and in the remaining figures are identical hence no further description is needed of the former.

It will be seen that by the construction hereinbefore set forth the rear ends of the scraper bars are suspended from the frame by flexible suspending means which are of such a nature as to permit the rear ends of the bars to be vertically adjusted. In like manner, the front ends of the scraper bars are independently supported from the frame by flexible suspension means which are of such a nature to permit said front ends of the bars to be vertically adjusted; means being provided to effect such vertical adjustment of the rear and front ends of the bars. Furthermore, flexible means is provided for effecting longitudinal adjustment of the scraper bars with respect to the frame, it being obvious that the scraper bars will lend themselves to such longitudinal adjustment in any vertical position occupied by said bars, owing to the fact that said scraper bars are flexibly suspended or supported. It follows that by this construction I obtain a degree of flexibility and adjustability for the scraper bars which is extremely desirable in a machine of this class, and which permits the desired contour to be applied to the road surface that is operated upon. To vary the angular divergence between the scraper bars I employ the pivotal link connections which have been successfully used by me for many years and which are shown in patent granted to me on September 4, 1894, No. 525,426. Irrespective of the flexibility of the supporting and adjusting elements for the scraper bars, the machine presents great rigidity under working stress, and the machine, therefore, develops great efficiency in operation as well as durability and economy in construction.

While I have illustrated and described the preferred construction for carrying my invention into effect, this is capable of variation and modification without departing from the spirit of the invention. I, therefore, do not wish to be limited to the precise details of construction as set forth, but desire to avail myself of such variations and modifications as come within the scope of the appended claims.

Having described my invention what I claim as new and desire to secure by Letters Patent is:

1. A device of the class described, comprising a wheeled body; angularly disposed forwardly diverged scraper bars arranged at opposite sides of said body; means pivotally connecting the forward ends of said bars with said body, said means being manually adjustable for effecting angular adjustment of said bars relative to the surface acted upon; means pivotally connecting the rearward ends of said bars, said means maintaining said bar ends in spaced relation; means manually operable from said body for effecting elevation of the respective ends of said bars; and means manually operable from said body for forwardly drawing the rearward ends of said scraper bars to increase the divergency of the forward ends thereof, substantially as described.

2. In a device of the class described, the combination of a wheeled body; angularly disposed bars arranged at opposite sides of said body; a pivotal connection between the rearward ends of said bars; a pair of links pivotally connecting the forward end of each of said bars with said body, the inner end of one of the links of each of said pair of links being adjustably secured for effecting angular adjustment of the scraper bars relative to the surface acted upon, substantially as described.

3. A device of the class described, comprising a wheeled body; angularly disposed forwardly diverged scraper bars arranged at opposite sides of said body; means pivotally connecting the forward ends of said bars with said body, said means being manually adjustable for effecting angular adjustment of said bars relative to the surface acted upon; means pivotally connecting the rearward ends of said bars, said means maintaining said bar ends in spaced relation; cranes at the forward ends of said body for effecting elevation of the forward ends of the said scraper bars; and manually operable means for effecting elevation of the rearward ends of said bars, substantially as described.

4. In a road leveling device, a supporting frame, scraper bars having converging rear ends and diverging forward ends, means for supporting the diverging forward ends of the bars from the frame for vertical adjustment and spreading action, means for effecting longitudinal adjustment of the bars and varying the angular divergence thereof through the spreading action of said supporting means, a cross connection between the converging rear ends of the bars, a guide member attached to said cross connection, a looped chain fastened at one end to the frame and in running engagement at its bight with said guide member, and a winding element on the frame to which the other end of said chain is connected.

5. In a road leveling device, a supporting frame, scraper bars having converging rear ends and diverging front ends, pivotal connections between the frame and the diverging front ends of the scraper bars, adapting said bars for vertical adjustment and longitudinal movements, in which said pivotal connections vary the degree of angular divergence of the bars, suitable means for moving the bars longitudinally and acting in conjunction with said pivotal connections to vary the divergence of the bars, a flexible suspension device supporting the converging rear ends of the bars from the frame, winding means associated with said flexible suspension device whereby the latter may be wound and unwound and the rear ends of the bars vertically adjusted in unison and locked in any position of adjustment, flexible suspension devices at the forward ends of the frame and connected with the diverging front ends of the bars, winding devices associated therewith whereby such ends of the bars may be vertically adjusted independently of each other and locked in any position of adjustment, said flexible suspension devices being adapted to permit the bars to move longitudinally of the frame and to be adjusted relatively to each other to vary the spread thereof, means for swinging the bars longitudinally, and pivotal connections between the bars and frame acting in a longitudinal swinging motion of the bars to vary the spread thereof.

6. In a road leveling device, a supporting frame, scraper bars having converging rear ends and diverging front ends, pivotal connections between the frame and the diverging front ends of the scraper bars, adapting said bars for vertical adjustment and longitudinal movements, in which said pivotal connections vary the degree of angular divergence of the bars, suitable means for moving the bars longitudinally and acting in conjunction with said pivotal connections to vary the divergence of the bars, flexible suspension and hoisting means supporting the converging rear ends of the bars from the frame and whereby such ends of the bars may be vertically adjusted in unison, and flexible suspension and hoisting devices at the forward end of the frame and connected with the diverging front ends of the bars, whereby such ends of the bars may be vertically adjusted independently of each other, said flexible suspension and hoisting devices being adapted for securing the bars in any position of adjustment to permit the bars to move longitudinally of the frame and to be adjusted relatively to each other to vary the spread thereof.

7. In a road leveling device a supporting frame, scraper bars having converging rear ends and diverging front ends, arms or links pivotally connecting the forward diverging ends of the bars with the frame and adapted to permit said bars to move longitudinally of the frame and also in a vertical plane, and to adjust the bars in their longitudinal movement to vary their angle of divergence, means for moving the bars and coacting with said pivotal connections to vary the spread of the bars, a chain flexibly suspending the converging rear ends of the bars from the frame, means for adjusting said chain for raising and lowering the rear ends of the bars in unison, chains flexibly suspending the forward diverging ends of the bars from the frame, and adjusting devices associated with said chains whereby the forward ends of the bars may be vertically adjusted independently of each other.

8. In a road leveling device, a supporting frame, scraper bars having converging rear ends and diverging front ends, pivotal connections between the frame and diverging front ends of the bars adapted to permit longitudinal and vertical adjustment of said bars and to adjust the bars in and out to vary their angle of divergence on the longitudinal movement thereof, means for longitudinally adjusting the bars, a flexible element supporting the converging rear ends of the bars from the frame, a winding device associated with said flexible element whereby the rear ends of the bars may be simultaneously raised or lowered, and cranes at the forward ends of the frame including elements flexibly supporting the diverging front ends of the bars and winding devices for adjusting said elements to raise or lower the said forward ends of the bars independently of each other.

9. In a road leveling device, the combination of a frame, scraper bars having converging rear ends and diverging forward ends, spreader links pivotally connecting the diverging forward ends of the bars with the frame and adapted to permit vertical adjustment thereof, means for effecting longitudinal adjustment of the bars and varying the angular divergence thereof through the action of said links, a cross piece pivotally connecting the converging rear ends of the scraper bars, cranes at the forward end of the frame flexibly suspending the diverging forward ends of the scraper bars and whereby the same may be independently raised and lowered, a chain carrying a pulley block and having end portions connected with the opposite ends of the cross piece, a looped chain having one end fastened to the frame and its bight engaging said pulley block, and a winding device associated with the opposite end of said looped chain, whereby the converging rear ends of the scraper bars are flexibly supported and adapted to be raised and lowered in unison.

10. In a road leveling device, a supporting frame, scraper bars having converging rear ends and diverging front ends, means supporting the diverging front ends of the bars for vertical adjustment and spreading action, means for effecting longitudinal adjustment of the bars and varying the angular divergence thereof through the spreading action of said supporting means, a winding element on the frame, a looped chain respectively fastened at its terminals to the frame and to the winding element, and a pulley connected with the converging rear ends of the bars and engaging the bight of said looped chain.

11. In a road leveling device, a supporting frame, scraper bars having converging rear ends and diverging front ends, means supporting the diverging front ends of the bars for vertical relative transverse and lateral tilting adjustments, a cross bar composed of sections having pivotally connected inner ends connected respectively at their outer ends to the converging rear ends of the bars, means connected with said sections of the cross bar for supporting and vertically adjusting the rear ends of the scraper bars and tilting said sections on their pivotal connection to tilt the scraper bars laterally, and means for locking the cross bar sections against pivotal movement.

12. In a road leveling device, a supporting frame, scraper bars having converging rear ends and diverging front ends, means supporting the diverging front ends of the bars for vertical relative transverse and lateral tilting adjustments, a cross bar composed of sections having pivotally connected inner ends connected respectively at their outer ends to the converging rear ends of the bars, means connected with said sections of the cross bar for supporting and vertically adjusting the rear ends of the scraper bars and tilting said sections on their pivotal connection to tilt the scraper bars laterally, and means for locking the cross bar sections in various positions against pivotal movement.

13. In a road leveling device, a supporting frame, scraper bars having converging rear ends and diverging front ends, means for supporting the converging rear ends of the bars for longitudinal and relative transverse and lateral tilting adjustments, means for effecting such adjustments, winding elements at the forward ends of the frame, a looped flexible element fastened at one end to each winding element, said flexible elements being fastened at their opposite ends to the frame, and pulleys connected with the forward ends of the scraper bars and engaging the bights of the looped flexible elements.

14. In a road leveling device, a supporting frame, scraper bars having converging rear ends and diverging front ends, means pivotally connecting the converging rear ends of the bars to permit lateral swinging movement thereof, means coupled to said connecting means for vertically adjusting the rear ends of the bars and securing the same in any position of adjustment and for flexibly suspending said bars to permit free longitudinal swinging movement thereof, links pivotally supporting the forward ends of the bars for vertical adjustment and adapted upon reverse longitudinal swinging movements thereof to increase and decrease their angle of divergence, and means for imparting longitudinal swinging movement to the bars.

15. In a road leveling device, a supporting frame, scraper bars having converging rear ends and diverging front ends, means pivotally connecting the converging rear ends of the bars to permit lateral swinging movement thereof, means coupled to said connecting means for vertically adjusting the rear ends of the bars and securing the same in any position of adjustment and for flexibly suspending said bars to permit free longitudinal swinging movement thereof, links pivotally supporting the forward ends of the bars for vertical adjustment and adapted upon reverse longitudinal swinging movements thereof to increase and decrease their angle of divergence, and means coupled to the said connecting means to impart longitudinal swinging movement to the bars.

16. In a road leveling device, a supporting frame, scraper bars having converging rear ends and diverging front ends, supporting means at the rear end of the frame for pivotal connecting, vertically adjusting and flexibly suspending the rear ends of the bars for swinging motion, links pivotally supporting the front ends of the bars for vertical and longitudinal adjustments and adapted in the longitudinal adjustments of said bars to increase or decrease the angle of divergence thereof, flexible elements connected with the forward ends of the bars for effecting independent vertical adjustment thereof and whereby such ends of the bars are mounted for swinging motion, and means coacting with said links for adjusting the bars longitudinally.

17. In a road leveling machine, a supporting frame, angularly disposed scraper bars having converging rear ends and diverging front ends, means pivotally connecting the rear ends of the bars, means for flexibly supporting and elevating the rear ends of the bars, cranes including flexible elements for independently raising and lowering the forward ends of the bars, a pair of links pivotally coupling the forward end of each bar to the frame, one link of each pair being universally pivoted at one end to the frame and the other link of each pair being pivoted at one end to the bar for lateral motion and to the adjacent end of the first named link for vertical motion and adjustably coupled at its opposite end to the first named link to effect lateral tilting motion of the bars, and means for moving the bars to longitudinally vary the angular divergence therebetween through the action of said links.

18. A device of the class described comprising a wheeled body, angularly disposed forwardly diverged scraper bars arranged at opposite sides of said body, means pivotally connecting the forward ends of said bars with said body, said means being adapted to permit longitudinal and vertical movements of the bars and to effect a variation in the angle of divergence of the bars in their longitudinal movement, means pivotally connecting and flexibly suspending the rear ends of the bars, said means being operable to vertically adjust the rear ends of the bars in unison while freely permitting longitudinal swinging and lateral pivotal movements thereof, means coacting with the first named means for longitudinally swinging and effecting variations in the angular divergence of the bars, and flexible adjusting elements connected with the forward ends of the bars whereby said forward ends of the bars may be vertically adjusted independent of each other.

19. In a machine of the class described, a frame, forwardly divergent scraper bars, flexible means for supporting the rearward ends of the scraper bars from the frame and for effecting vertical adjustment of said rear ends, flexible means for supporting the forward ends of the two scraper bars from the frame and for effecting vertical adjustment of said front ends, links pivotally connecting the scraper bars with the frame, and means for effecting longitudinal adjustment of the scraper bars with respect to the frame to vary the angular divergence of the scraper bars through the medium of the links.

20. In a machine of the class described, a frame, forwardly divergent scraper bars, flexible means for supporting the rearward ends of the scraper bars from the frame and for effecting vertical adjustment of said rear ends in unison, flexible means for supporting the forward ends of the two scraper bars from the frame and for effecting vertical adjustment of said front ends independently, links pivotally connecting the scraper bars with the frame, and means for effecting longitudinal adjustment of the scraper bars with respect to the frame to vary the angular divergence of the scraper bars through the medium of the links.

In testimony whereof I affix my signature in the presence of two witnesses.

NATHANIEL S. MONROE.

Witnesses:
H. Hough,
Bennett S. Jones.